United States Patent [19]

Takahashi et al.

[11] Patent Number: 5,774,758
[45] Date of Patent: Jun. 30, 1998

[54] IMAGE FORMING APPARATUS FOR FORMING IMAGES OF ALL ORIGINAL DOCUMENT PAGES IN THE STAPLE SORTING MODE

[75] Inventors: Toshiharu Takahashi, Kawasaki; Masako Shibaki, Yokohama; Miki Konno, Kawasaki, all of Japan

[73] Assignee: Kabushiki Kaisha Toshiba, Kawasaki, Japan

[21] Appl. No.: 704,951

[22] Filed: Aug. 26, 1996

[30] Foreign Application Priority Data

Aug. 31, 1995 [JP] Japan .................................. 7-246984

[51] Int. Cl.⁶ ........................... G03G 15/00; H04N 1/00; H04N 1/40
[52] U.S. Cl. ............................ 399/1; 358/296; 358/404; 358/444; 399/87; 399/403; 399/408
[58] Field of Search .................................. 399/407, 408, 399/410, 82–83, 87, 19, 38, 144, 403, 1; 358/444, 474, 396, 296, 404

[56] References Cited

U.S. PATENT DOCUMENTS 5,087,979  2/1992  Schaertel .................................. 358/296
5,250,985  10/1993  Ishii et al. .......................... 399/408 X

*Primary Examiner*—S. Lee
*Attorney, Agent, or Firm*—Foley & Lardner

[57] ABSTRACT

A basic control portion stores image information read by a scanner in a page memory of a page memory portion through image processing means. When memory full takes place such that image information to be stored in the page memory is larger than the capacity of the memory in a case where a staple sorting mode has been set, the basic control portion suspends the staple mode and forms images in a set sorting mode by using image data stored in the page memory. As a result, even if memory full takes place in the staple mode, the image can normally be formed.

11 Claims, 15 Drawing Sheets

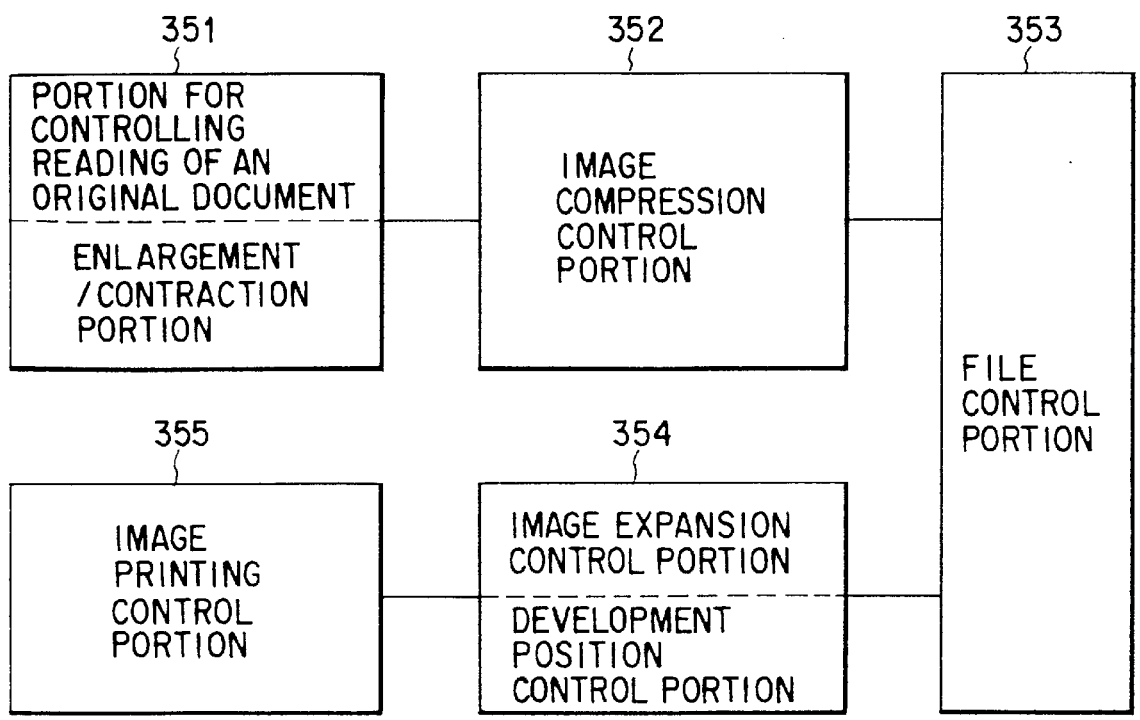
F I G. 6

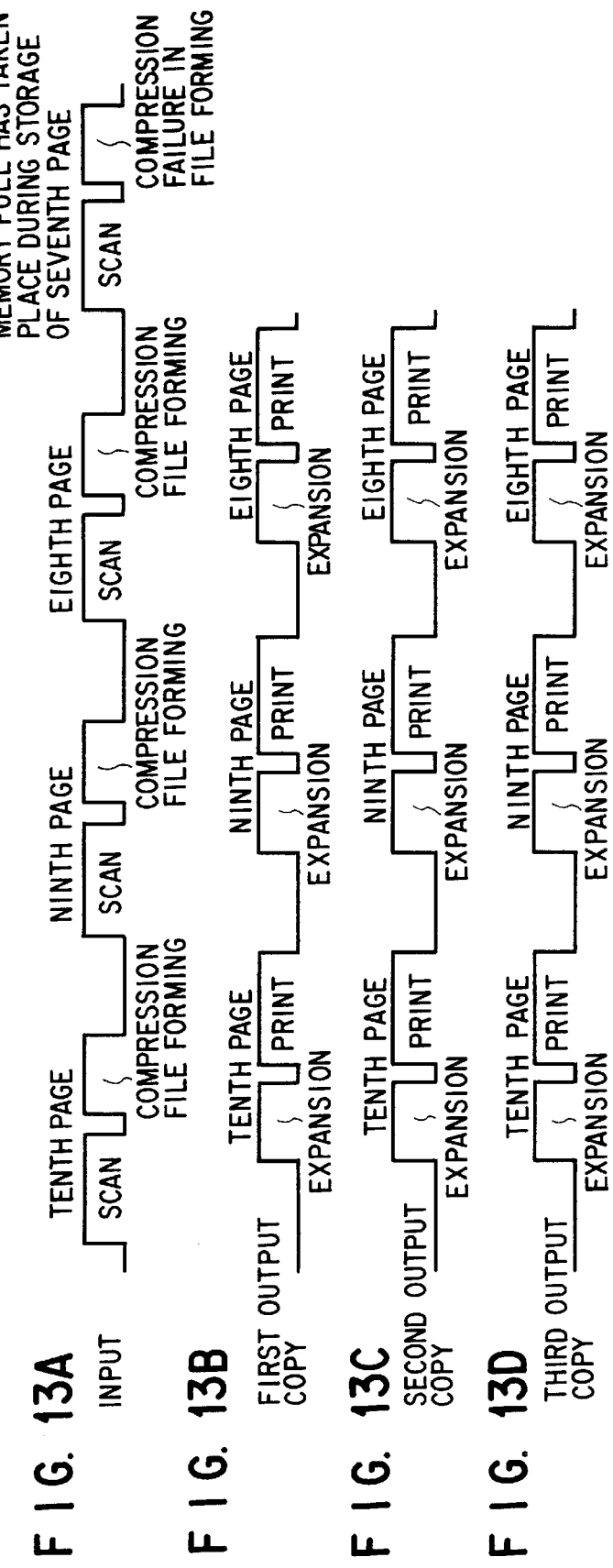

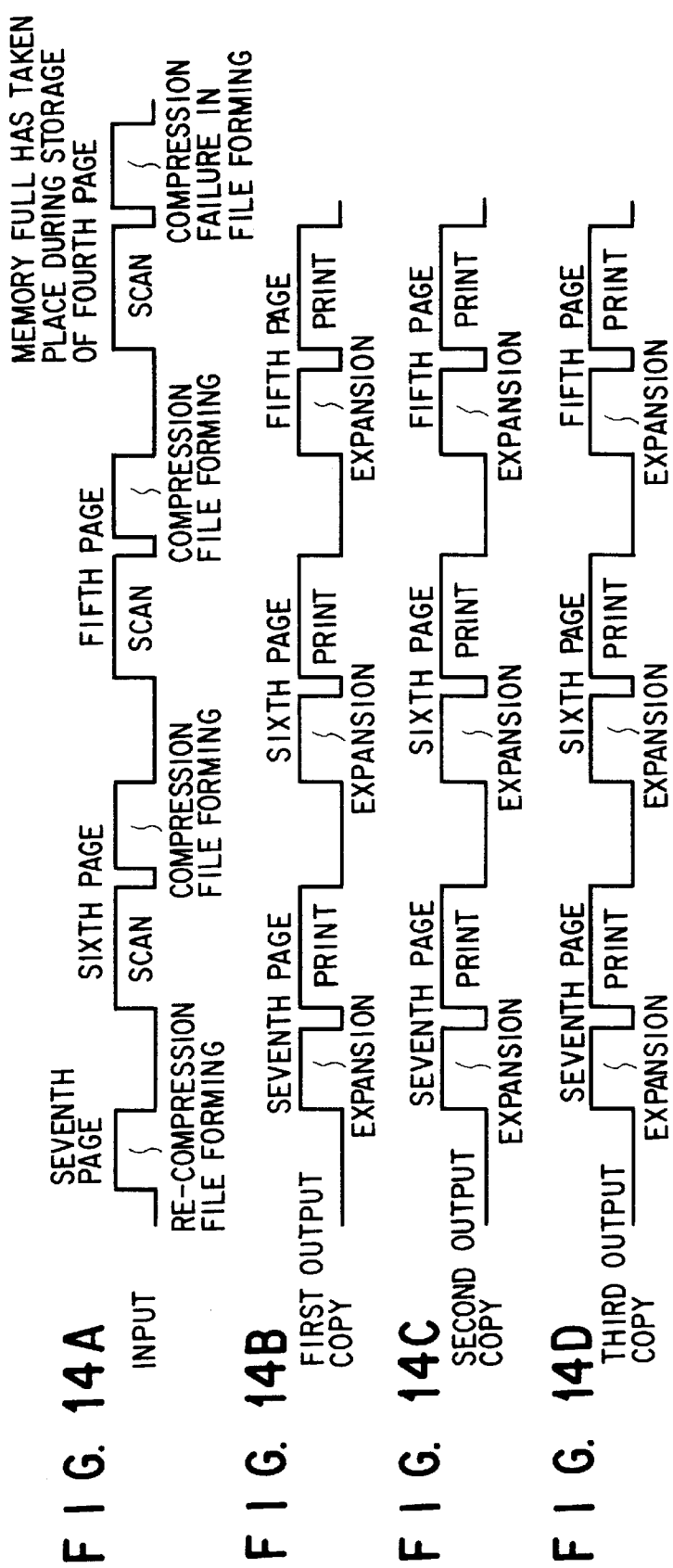

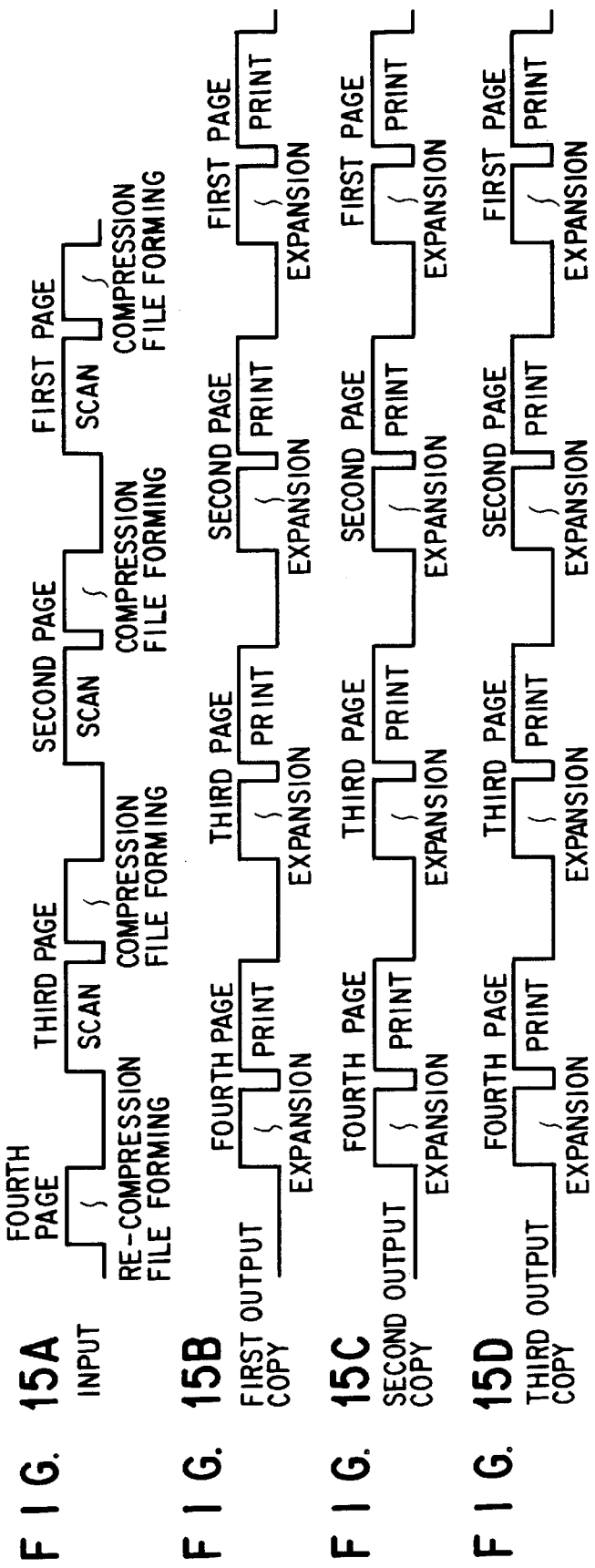

IMAGE FORMING APPARATUS FOR FORMING IMAGES OF ALL ORIGINAL DOCUMENT PAGES IN THE STAPLE SORTING MODE

BACKGROUND OF THE INVENTION

1. Field of the Invention

The present invention relates to an image forming apparatus, such as a digital copying machine, having functions of compressing and expanding an image, storing images and stapling copies, and to a method of forming an image.

2. Description of the Related Art

Hitherto, a digital copying machine, serving as the image forming apparatus, has been provided with a so-called memory edition and copying function capable of combining a plurality of original-document images with one another to form an image for one sheet so as to print (form) the image. Moreover, the copying machine of the foregoing type has been provided with an electronic sorting and copying function for compressing images read by a scanner and supplied from the same to store the compressed images in a page memory having file areas sectioned into areas for respective pages and then expanding and printing image data stored in the page memory.

The digital copying machine of a type having a stapler is enabled to have a staple sorting mode which is set for the purpose of stapling sheets printed and discharged due to the electronic sorting and copying function to form one or more copies of sheets.

However, if data stored in a file area of a page memory is larger than the capacity of the memory, that is, if so-called memory full takes place when the foregoing staple sorting mode has been set, then input operations have been interrupted, all of image data items, which have been input, compressed and stored have been deleted and the printing (image forming) operation has been interrupted.

SUMMARY OF THE INVENTION

An object of the present invention is to provide an image forming apparatus capable of forming an image even if memory full takes place such that data stored in a file area of a page memory is larger than the capacity of the memory in a state where a staple sorting mode has been set.

In order to achieve the above object, according to one aspect of the present invention, there is provided an image forming apparatus comprising: means for setting image forming conditions including a mode for binding in units of a predetermined number of image forming mediums when images are formed on the image forming mediums from image information; means for reading image information of an original document; means for storing image information read by the reading means within a storage capacity; means for forming images under the image forming conditions set by the setting means and in accordance with image information stored in the storage means; and control means for performing control such that, when image information read by the reading means and to be stored in the storage means is larger than the storage capacity of the storage means in a case where the mode for binding in units of a predetermined number of image forming mediums has been set by the setting means, the image forming means is caused to perform the image forming operation by using image information stored in the storage means in such a manner that the mode is suspended.

According to another aspect of the present invention, there is provided an image forming apparatus comprising: means for setting image forming conditions including a first mode for binding in units of a predetermined number of image forming mediums and a second mode for forming images on the two sides of the image forming mediums, when images are formed on the image forming mediums from image information; means for reading information of an original document; means for forming images under the image forming conditions set by the setting means and in accordance with image information read by the reading means; means for conveying the image forming mediums to the image forming means, temporarily stacking onto an image forming medium receiving portion a plurality of image forming mediums each having one side on which an image has been formed, inverting the image forming mediums, supplying the same to the image forming means, and conveying to a discharge portion the image forming mediums each having the two sides printed by the image forming means in a case where a two side image forming mode has been set by the setting means, the receiving portion having a receivable capacity; and control means for performing control that, when the first and second modes are set to the image forming conditions by the setting means and in a case where the number of the image forming mediums is larger than the receivable capacity for the image forming medium receiving portion, the image forming means is caused to perform the image forming operation by using the image information in such a manner that the first mode for binding in units of a predetermined number of image forming mediums is suspended and the other image forming conditions set by the setting means are remained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 6 is a functional block diagram showing an electronic sorting function of the image forming apparatus;

FIGS. 13A to 13D are timing charts of input of an original document and printing out of the images when output is performed in the-staple sorting mode;

FIGS. 14A to 14D are timing charts of input of an original document and printing out of the images when output is performed in the staple sorting mode; and FIGS. 15A to 15D are timing charts of input of an original document and printing out of the images when output is performed in the staple sorting mode.

DETAILED DESCRIPTION OF THE PREFERRED EMBODIMENTS

A preferred embodiment of the present invention will now be described with reference to the drawings.

Figure 1:
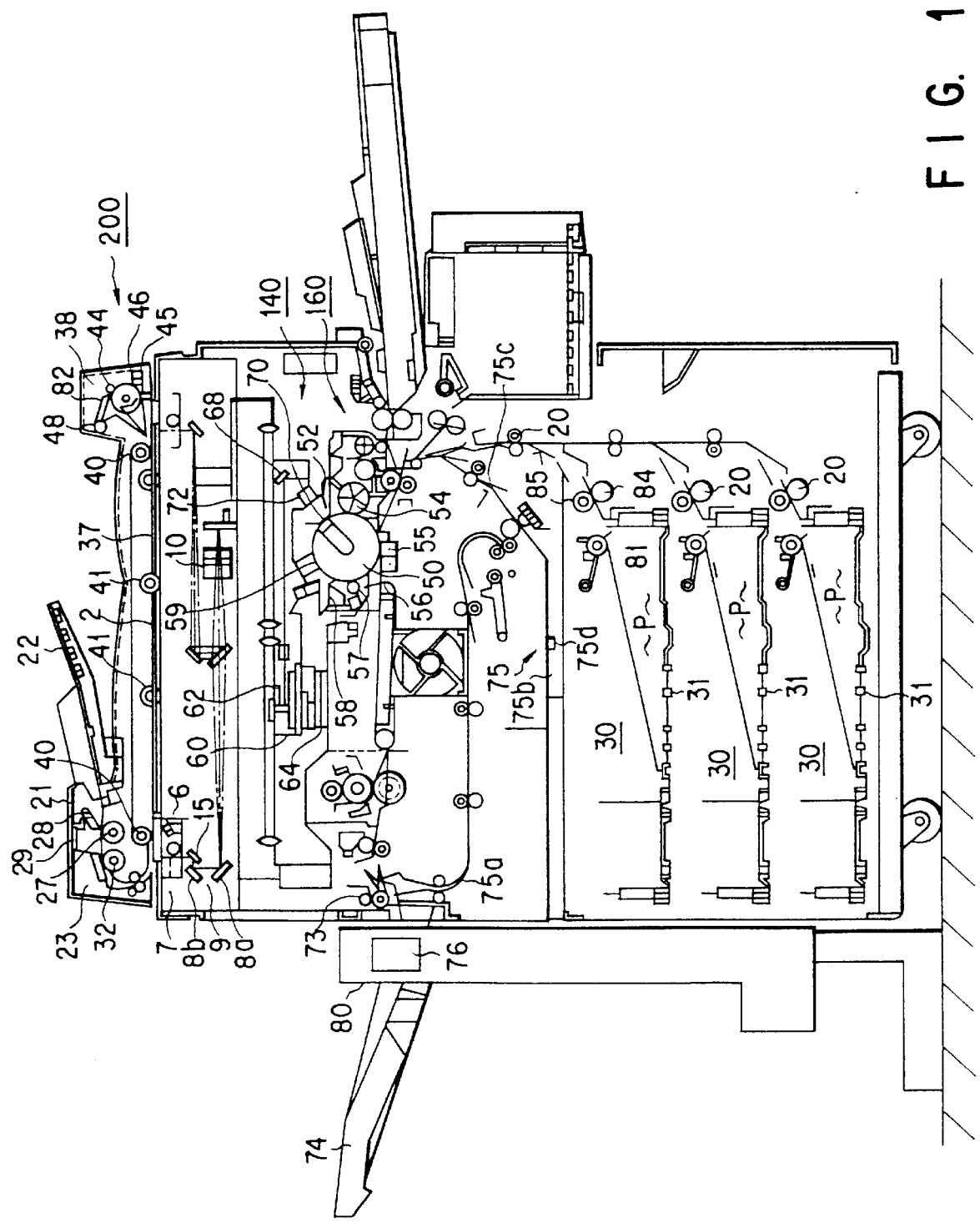
FIG. 1 is a cross sectional view showing an image forming apparatus according to the present invention.

FIG. 1 is a schematic diagram showing the overall structure of an electronic copying machine which is an image forming apparatus according to the present invention. The apparatus has an original-document scanning portion 140 and an image forming portion 160. An automatic original-document supply unit 200 is mounted on an upper portion of the electronic copying machine.

The automatic original-document supply unit 200 has a cover body 21 serving as the frame and having a rear end which is fastened to the rear end of the upper portion of the body of the apparatus by a hinge unit (not shown) so that the cover body 21 can be opened and closed as required. Thus, the overall body of the automatic original-document supply unit 200 can be rotated and displaced to open the upper portion of an original-document retainer 2. An original-document supply frame 22 capable of collectively holding a plurality of original-document sheets is disposed at a somewhat leftward position of the upper surface of the cover body 21. A supply means 23 for, one by one, extracting the plural original-document sheets to supply the sheets to an end (the left end of FIG. 1) of the original-document retainer 2 is disposed at an end of the apparatus. The supply means 23 has pickup rollers 27 for extracting the original document, a weight plate 28 for pressing the original document against the pickup rollers 27 and an empty sensor 29 serving as an original-document detection sensor for detecting a state where the original document is set to the original-document supply frame 22. In a direction in which the pickup rollers 27 extract the original document, sheet supply rollers 32 are disposed so that the original document sheets are sequentially supplied. An original-document conveying belt 37 covering the upper surface of the original-document retainer 2 is arranged on the upper surface of the original-document retainer 2. The original-document conveying belt 37 comprises a wide endless belt arranged between a pair of belt rollers 40 and having a white outer surface, the original-document conveying belt 37 being moved forwards or rearwards by a belt drive mechanism (not shown). On the reverse side of the inside portion of the original-document conveying belt 37, there are disposed a plurality of belt holding rollers 41 for pressing the surface of the original-document conveying belt 37 against the original-document retainer 2 and a set switch (not shown) for detecting a state where the automatic original-document supply unit 200 is opened or closed. The original document supplied by the supply means 23 is conveyed from an end (the left end) of the original-document retainer 2 to another end (the right end) of the same. A sheet-discharge means 38 is disposed in the right-hand portion of the apparatus. The sheet-discharge means 38 has conveying rollers 44, pinch rollers 45 for pressing the original document against the conveying rollers 44, a sheet discharge sensor 46 serving as an original-document detection means for detecting the rear end of the original document which is moved in a direction in which the original document is discharged. Sheet discharge rollers 48 are disposed downstream from the passage for discharging the original document. The original document discharge passage has a gate 82 for introducing the original document into the original-document retainer 2 while reversing the original document. As a result, images can be copied onto the two sides of the original document.

The original-document scanning portion 140 consists of an exposure lamp 6 serving as a light source; a first carriage 7 having a mirror 15; a second carriage 9 having mirrors 8a and 8b for warping the optical path; a lens 10; a photoelectric conversion portion 11 for receiving reflected light; a drive system (not shown) for changing the positions of the foregoing elements; and an A/D conversion portion (not shown) for converting an output from the photoelectric conversion portion 11, that is, image data from analog data to digital data. The first and second carriages 7 and 9 are connected to each other by a timing belt (not shown) and arranged in such a manner that the second carriage 9 is moved in the same direction as that of the movement of the first carriage 7 at a speed which is the half of that of the first carriage 7. As a result, scanning can be performed in such a manner that the length of the optical path to the lens 10 is made to be constant. The lens 10 has a fixed focal length and arranged to be moved in the direction of the optical axis when the magnification is changed. The photoelectric conversion portion 11 photoelectrically convert light reflected by the original document, the photoelectric conversion portion 11 being mainly composed of, for example, a CCD line image sensor. In this case, one pixel of the original document corresponds to one element of the CCD sensor. An output from the photoelectric conversion portion 11 is transmitted to the A/D conversion portion. The movement of each of the first and second carriages 7 and 9 and the mirrors 12a and 12b is performed by a stepping motor (not shown). The first and second carriages 7 and 9 are moved in accordance with the operation of a timing belt (not shown) arranged between a drive pulley (not shown) connected to a rotational shaft of the stepping motor and an idle pulley (not shown). The lens 10 is moved in the direction of the optical axis due to spiral operation of a spiral shaft (not shown) rotated by a corresponding stepping motor (not shown).

Reference numeral 60 represents an electrooptic conversion portion (a semiconductor laser unit). A collimator lens 62, a polygonal mirror (polyhedron reflecting mirror) 64, a lens 66, reflecting mirrors 68 and 70 and a lens 72 are disposed to correspond to the electrooptic conversion portion 60. Thus, a photosensitive drum 50 is irradiated with a laser beam transmitted from an exposure unit 52.

The image forming portion 160 is formed by combining, for example, a laser optical system and an electrophotographic method capable of forming an image on transfer paper. That is, the image forming portion 160 has the photosensitive drum 50 serving as an image carrier rotatively supported at substantially the central portion of the apparatus. The exposure unit 52, a development unit 54, a transference charger 55, a separation charger 56, a cleaning charger 57, a destaticizing charger 58 and a charger 59 are disposed in this sequential order around the photosensitive drum 50. The photosensitive drum 50 is uniformly charged by the charger 59. Moreover, a laser beam emitted from the original-document scanning portion 140 causes the image of the original document to be formed on the photosensitive drum 50 so that an electrostatic latent image is formed.

The electrostatic latent image formed on the photosensitive drum 50 is developed by the development unit 54. The developed image is transferred to copying paper P supplied, by the transference charger 55, from a sheet supply cassette 30 serving as a paper supply means to be described later through the resist controllers 20. The copy paper P having the image transferred by the transference charger 55 is separated by the separation charger 56 due to AC corona discharge, and then conveyed to a fixing unit 72 by the conveyance belt. The copy paper P having the developed image, which has been melted and fixed by the fixing unit 72, is discharged onto a discharge tray 74 through a sorter 80 by a pair of discharge rollers 73. The sorter 80 has a stapler 76 for stapling each set of copied sheets in a staple sorting mode.

Developer retained on the photosensitive drum 50, from which the developed image has been transferred and separated to the copy paper P, is cleaned by the cleaning charger 57. Then, the destaticizing charger 58 makes the potential of the surface of the photosensitive drum 50 to be lower than a predetermined level to enable a next copying operation to be performed.

When the double side copying operation for printing images on the two sides of the copy paper P is performed, the copy paper P having the developed image, which has been melted and fixed by the fixing unit 72, is conveyed through a conveyance passage 75a, and then stacked on a tray 75b. The copy paper P, each having one side on which the image has been printed, is conveyed to the transference charger 55 through a conveyance passage 75c so that developed images are transferred to the residual sides, on which no image has been printed. A light-reflecting type paper sensor 75d is disposed in the lower portion of the tray 75b to detect whether or not paper sheets have been stacked on the tray 75b.

The conveyance passage 75a, the tray 75b, the conveyance passage 75c and the paper sensor 75d form an automatic double side device (ADD) 75 serving as an automatic double side reversing mechanism.

Reference numeral 30 represents each of a plurality of sheet supply cassettes mounted vertically and serving as a sheet supply means mounted detachably from the front portion of an apparatus body 1. The sheet supply cassette 30 is in the form of a cassette case 31 which is a box accommodating the copy paper P. An extraction end of the cassette case 31 is inclined with respect to a direction in which the copy paper P is extracted. The copy paper P accommodated in the cassette case 31 of the sheet supply cassette 30 is, by pickup rollers 81, picked up and extracted in the downward direction such that the uppermost sheet is picked up first. The copy paper P, extracted by the pickup rollers 81 and conveyed to the extraction end of the cassette case 31, is separated one by one in a sheet separation portion consisting of sheet supply rollers 84 and separation rollers (or a separation pad) 85 disposed on the inside portion of an upper portion of the cassette case 31 so as to be conveyed to the image forming portion 160.

Figure 2:
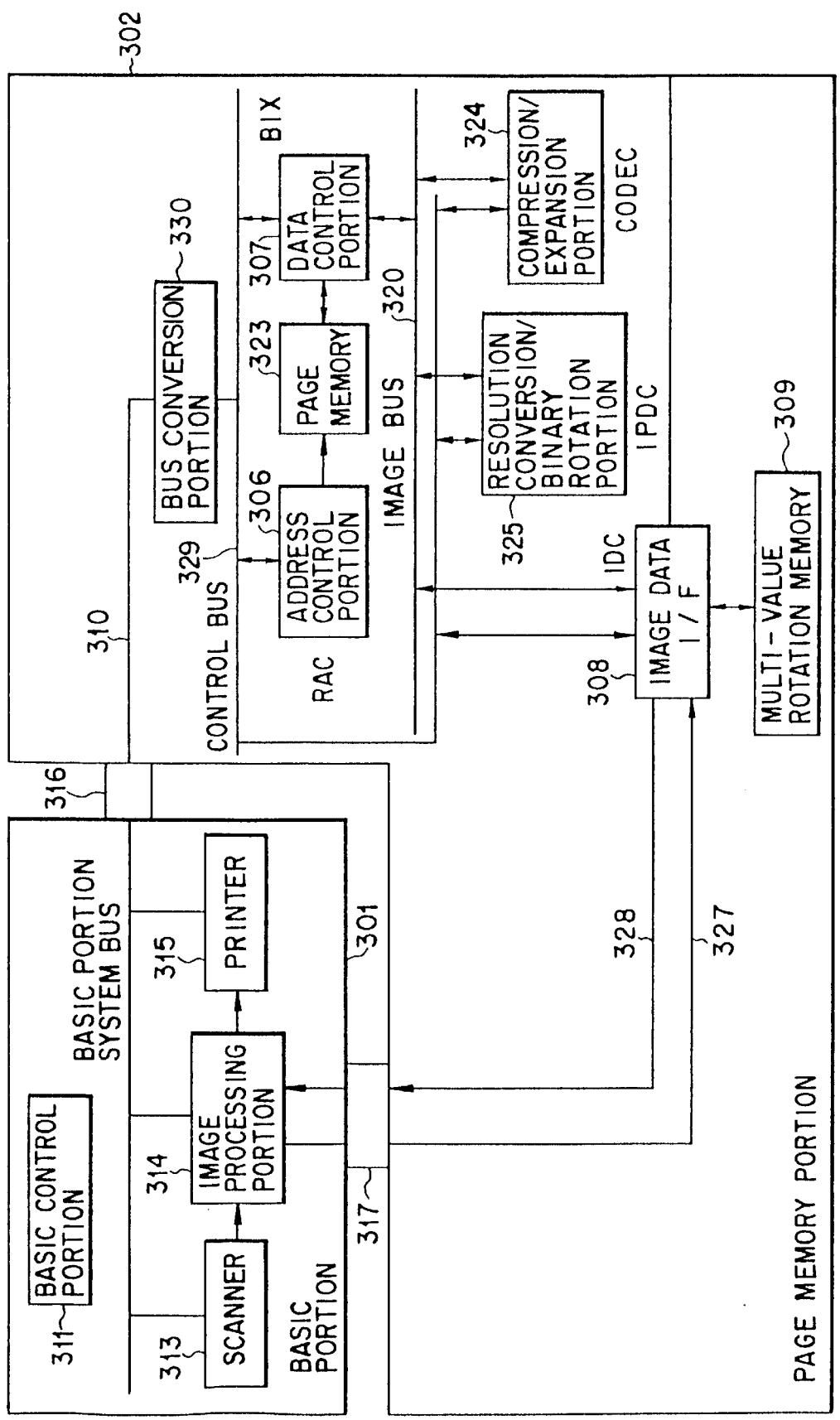
FIG. 2 is a block diagram showing the system structure of the image forming apparatus.
Figure 3:
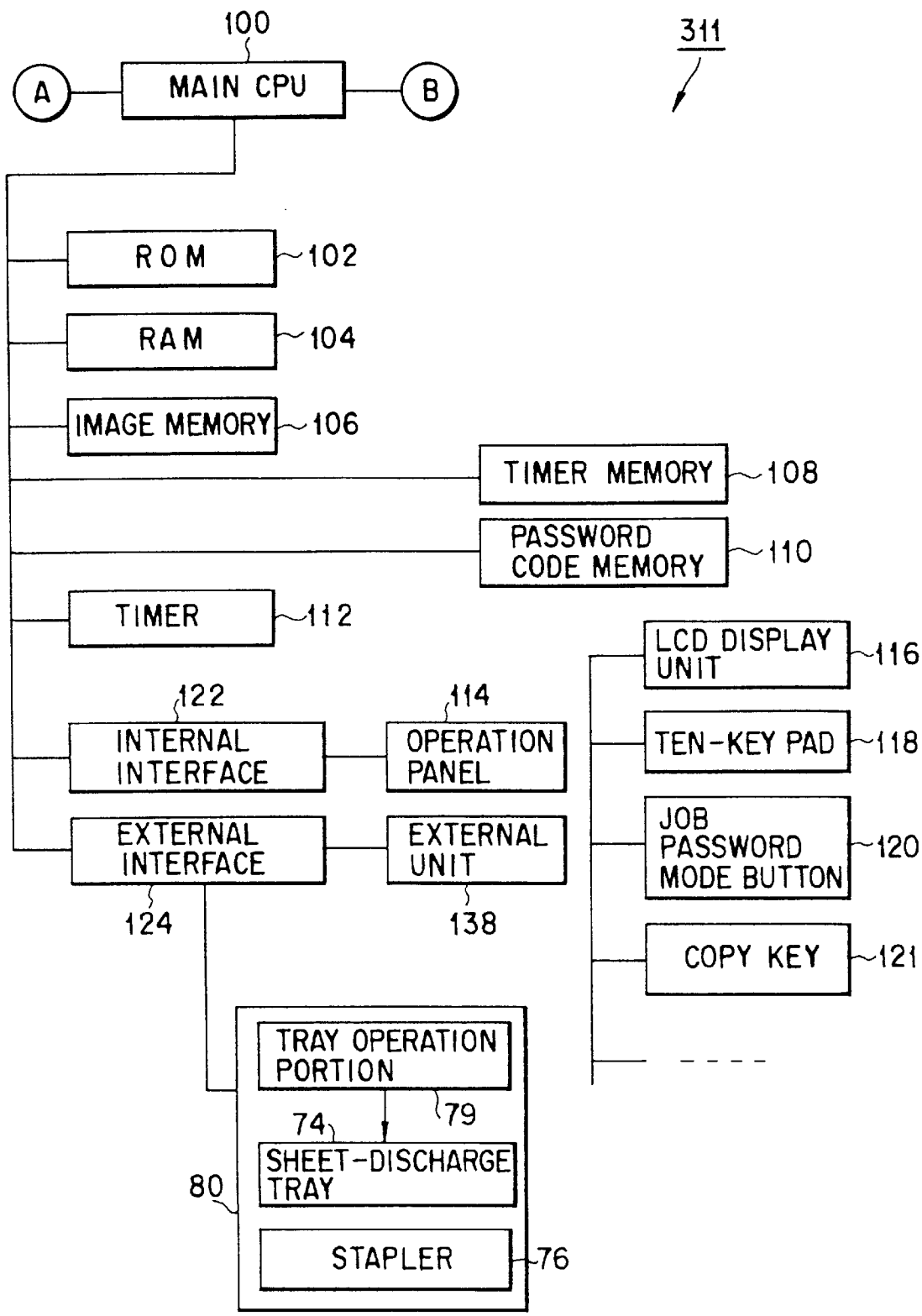
FIG. 3 is a block diagram showing the structure of a basic control portion.
Figure 4:
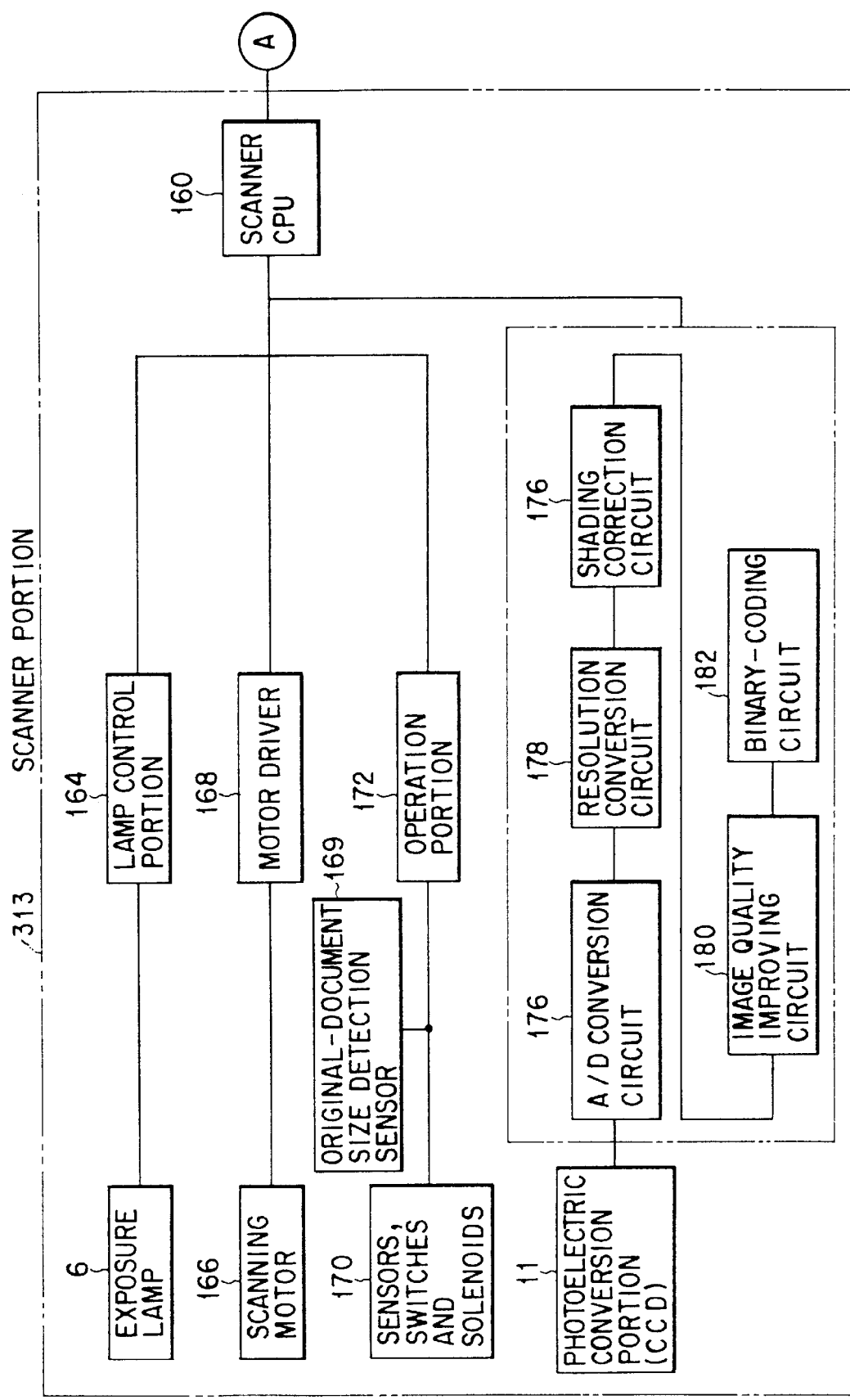
FIG. 4 is a block diagram showing the structure of a scanner portion.
Figure 5:
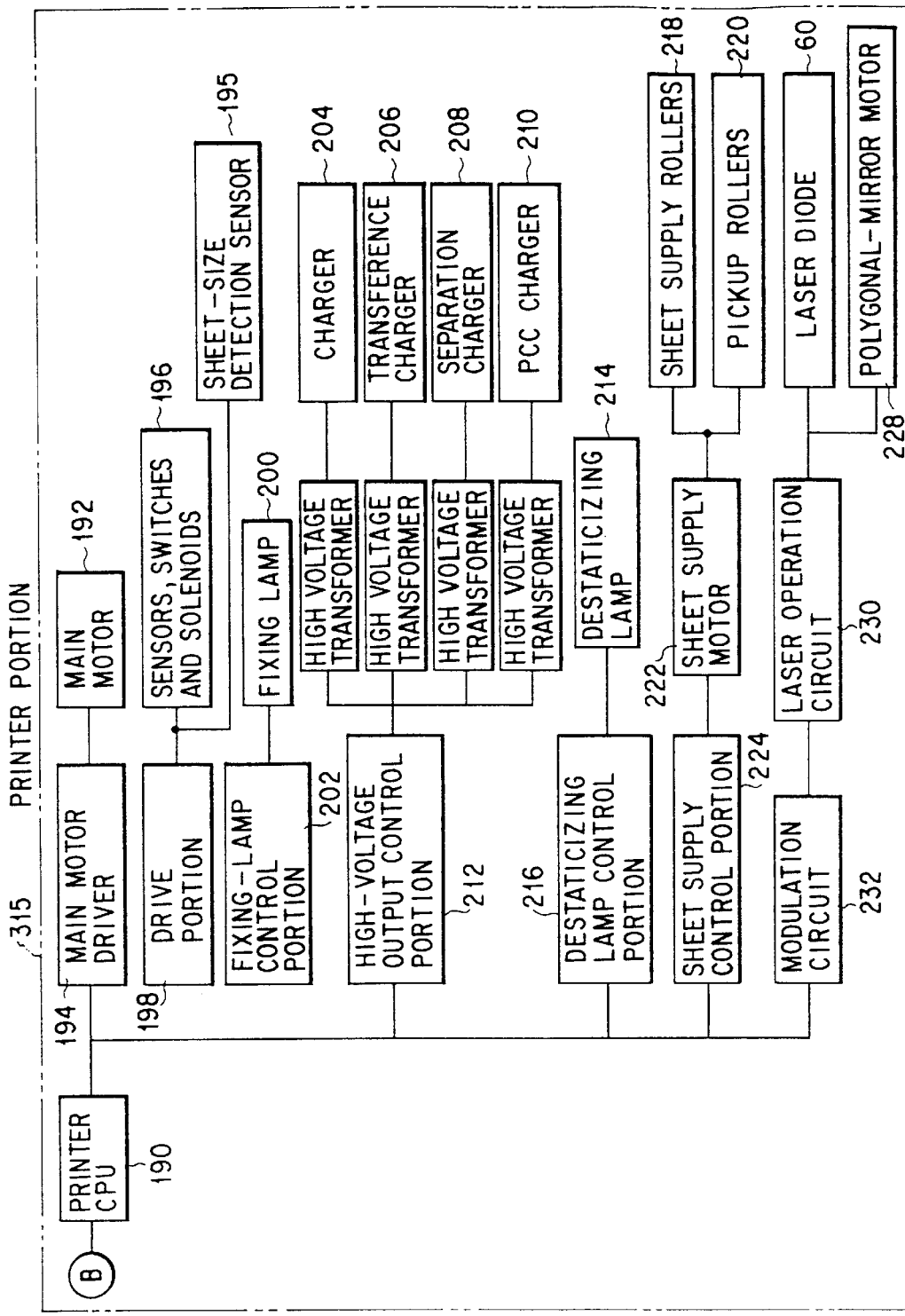
FIG. 5 is a block diagram showing the structure of a printer portion.

Referring to FIGS. 2 to 5, a control circuit for the image forming apparatus will now be described. FIG. 2 is a schematic block diagram of the image forming apparatus such as a digital copying machine control system according to the embodiment of the present invention. FIG. 3 shows a CPU portion, FIG. 4 shows a scanner portion and FIG. 5 shows a printer portion.

As shown in FIG. 2, the digital copying machine control system is composed of two blocks consisting of a basic portion 301 and a page memory portion 302. In the basic portion 301, an image processing portion 314 is connected between a scanner 313 and a printer 315 so that the digital copying machine is formed. The page memory portion 302 realizes memory copy by receiving and storing image data from the basic portion 301 and by again transferring the stored image data items to the basic portion 301.

The basic portion 301 and the page memory portion 302 are connected to each other by a basic-portion system interface 316 for communicating control data and a basic-portion image interface 317 for communicating image data.

The basic portion 301 consists of the scanner 313, the printer 315, the image processing portion 314 and a basic control portion 311 for controlling the foregoing units.

As shown in FIG. 3, a ROM 102, a RAM 104, an image memory 106, a timer memory 108, a password code memory 110, a timer 112, an internal interface 122 and an external interface 124 are connected to a main CPU 100 of the basic control portion 311. An operation panel 114 is connected to the internal interface 122. The operation panel 114 has an LCD display unit 116, a ten-key pad 118, a job password mode button 120, a copy key 121 and the like. The external interface 124 is connected to the sorter 80 and an external unit 138. A sheet-discharge tray 74 of the sorter 80 is driven by a tray drive portion 79.

In the structure formed as described above, image information is stored and read by the main CPU 100. In a case where a password code and image information are stored for example, image information read by the scanner portion under control of a scanner CPU 160 is stored in the image memory 106 to follow an instruction issued from the main CPU 100. The mode of the instruction from the main CPU 100 is determined in accordance with input (input using keys) from the operation portion.

Referring to FIG. 4, the detailed structure of the scanner portion 313 will now be described. The scanner CPU 160 of the scanner portion 313 is connected to a lamp control portion 164 for controlling an irradiation lamp 6, a motor driver 168 for controlling a scanning motor 166, an original-document size detection sensor 169 and an operation portion 172 for operating and controlling variable sensors, switches and solenoids 170 so as to control the connected elements. The scanner CPU 160 is also connected to an A/D conversion circuit 176 for processing image information supplied from the photoelectric conversion element 11, a resolution conversion circuit 178, a shading correction circuit 176, an image quality improving circuit 180 and a binary-coding circuit 182 so as to control the connected elements.

Referring to FIG. 5, the printer 315 will now be described in detail. In the printer 315, a printer CPU 190 is connected to a main motor driver 194 for rotating a main motor 192, a sheet-size detection sensor 195, an operation portion 198 for controlling sensors, switches and solenoids 196, a fixing-lamp control portion 202 for controlling a fixing lamp 200, a high-voltage output control portion 212 for controlling a charger 204, a transference charger 206, a separation charger 208 and a PCC charger 210, a destaticizing lamp control portion 216 for controlling a destaticizing lamp 214, a sheet supply control portion 224 for controlling a sheet supply motor 222 for rotating sheet supply rollers 218 and pickup rollers 220 and a modulation circuit 232 for controlling a laser operation circuit 230 for the electrooptic conversion portion (a laser diode) 60 and a polygonal-mirror motor 228.

The page memory portion 302 will now be described in detail with reference to FIG. 2. The structure of a bus line 310 connected to a system bus 318 of the basic portion 301 is converted into a bus line 329 by a bus conversion portion 330. A page memory 323 temporarily stores image data, while an address control portion 306 generates address for the page memory 323. An image bus 320 is a bus line for transferring data between devices in the page memory portion 302. A data control portion 307 controls data transference when data is transferred between the page memory 323 and the other device through the image bus 320.

An image data I/F 308 interfaces image data when image data is transferred to and from the basic portion 301 through the basic-portion image interface 317. A resolution conversion/binary rotation portion 325 converts the resolution of image data to the resolution of another unit when image data is transmitted to the unit having the different resolution, converts image data received from a unit having a different resolution to the resolution of the printer 315 of the basic portion 301 and rotates binary-coded image data by an angular degree of 90 degrees.

A compression/expansion portion 324 compresses supplied image data for the devices for performing facsimile transmission or optical disc storage which compresses and transmits image data and expands image data in the compressed form to be visualized through the printer 315. A multi-value rotation memory 309 is connected to the image data I/F means 308 and operated to rotate image data by an angular degree of 90 degrees or—90 degrees so as to transmit the rotated image data when the image data is transmitted to the printer 315.

FIG. 6 is a functional block diagram showing an electronic sorting function of the image forming apparatus according to the present invention. Referring to the functional block diagram shown in FIG. 6, a portion for controlling reading an original document and enlargement/contraction portion 351 corresponds to, for example, the scanner 313 and the image processing portion 314, an image compression control portion 352 and an image expansion control portion/development position control portion 354 correspond to the compression/expansion portion 324, an image printing control portion 355 corresponds to the printer 315 and a file control portion 353 corresponds to the data control portion 307 and the like.

The portion for controlling reading an original document of the portion for controlling reading of an original document and enlargement/contraction portion 351 quantizes image data supplied from the scanner portion 313 to write the same on the page memory 323. If an original document has been set to the automatic original-document supply apparatus 200, the portion for controlling reading of an original document causes the original document to be supplied from the automatic original-document supply apparatus 200 and reads the original document correspondently. The original document set to the automatic original-document supply apparatus 200 is read such that the final page is read first. If a double side original document has been instructed, the original document is read in such a manner that the reverse side of the final page is read first, the right side of the same is read and then the right side of the leading pages read last.

The enlargement/contraction portion of the portion for controlling reading of an original document and enlargement/contraction portion 351 is a sub-module of the portion for controlling reading of an original document and arranged to determine the reduction or the enlargement ratio (hereinafter called as a "magnification") in accordance with the relationship between the sheet and the size of the original document, determines the number of longitudinal and horizontal pixels of an image to be copied and processes, that is, enlarges or reduces image data supplied from the scanner portion 313.

In the image compression control portion 352 and the file control portion 353, image data on the page memory 323 is compressed and, in a file form, written on a region to be controlled.

Figure 7:
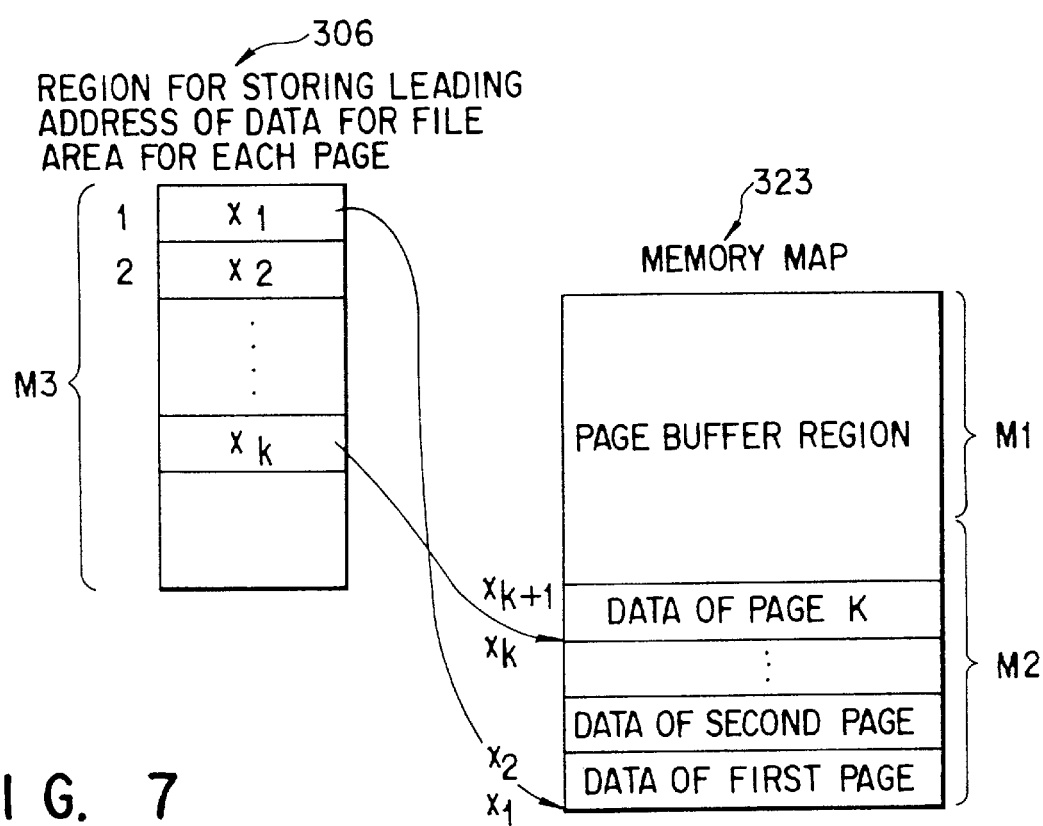
FIG. 7 is a diagram showing the structure of storage regions of a page memory.

FIG. 7 shows the structure of the storage region of the page memory 323 which is sectioned into page buffer region M1 on which image data of the original document read by the scanner portion 313 is written as it is and a file area M2 on which data formed by compressing the image data above is written and which is sectioned into regions for corresponding pages.

The leading address of each page of the file area M2 is stored in leading address storage region M3 for storing page data in each file area in the address control portion 306. Note that the file may be formed on a volatile memory, such as a RAM, or a large capacity non-volatile memory, such as a hard disk.

When an operator has set an original document to, for example, the automatic original-document supply apparatus 200 and depressed the copy key 121 to copy the original document, the portion for controlling reading of an original document and enlargement/contraction portion 351 causes the original document to be supplied and enlarges or contracts image data obtained by reading the supplied original document. The file control portion 353 writes the image data on the page memory 323. The image compression control portion 352 compresses written image data for each page and causes the same to be stored in the file area M2 sectioned into corresponding pages. The foregoing process is performed until all of the original document sheets set to the automatic original-document supply apparatus 200 are supplied. After data of all of the original document sheets has been stored in the page memory 323, the control is performed by the image expansion control portion/development position control portion 354.

The image expansion control portion/development position control portion 354 sequentially reads, from the file area M2, the compressed images of the original document to expand the image in units of one side (the page to be output) to be output (printed), the image expansion control portion/development position control portion 354 then transferring the expanded image to the image printing control portion 355. The foregoing process is performed until all of the original document images are read.

The sequential order of the operations of reading the compressed image data items are determined to correspond to the original document page numbers to be described later. The images are printed in the determined order, and then the printed sheets are stacked on the tray 75b of the automatic double side unit 75.

In the automatic double side unit 75, the sheets having the printed reverse sides are stacked on the tray 75b, and then the sheets are extracted from the tray 75b so that the right sides are printed. Then, the sheets having the two sides on which images have been printed are discharged onto the sheet-discharge tray 74. In a case where the original document has a plurality of sheets, the reverse side of each sheet is initially printed, and then all of the printed sheets having the printed reverse sides are stacked. Then, the right sides of the sheets are printed while being discharged from the automatic double side unit 75. Thus, the sheets having the printed two sides are discharged onto the sheet-discharge tray 74.

Figure 8:
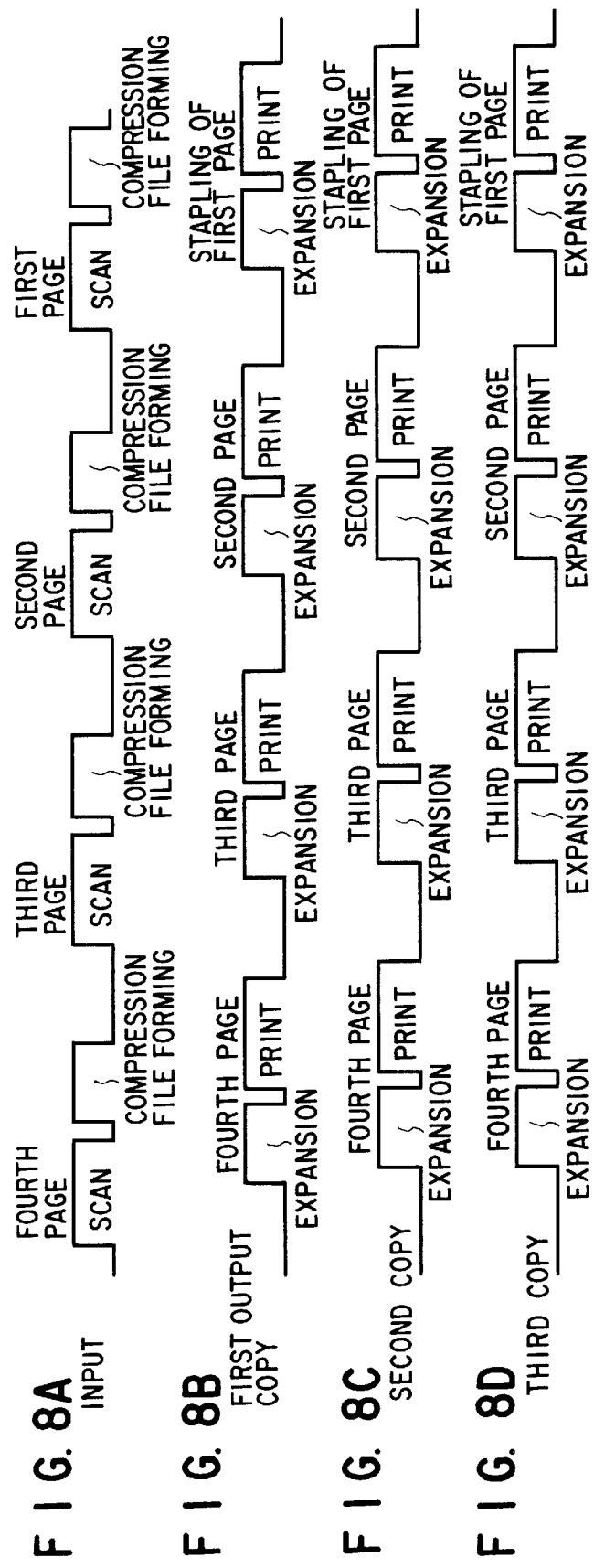
FIGS. 8A to 8D are timing charts of input of an original document and printing out of the images when output is performed in a staple sorting mode.
Figure 9:
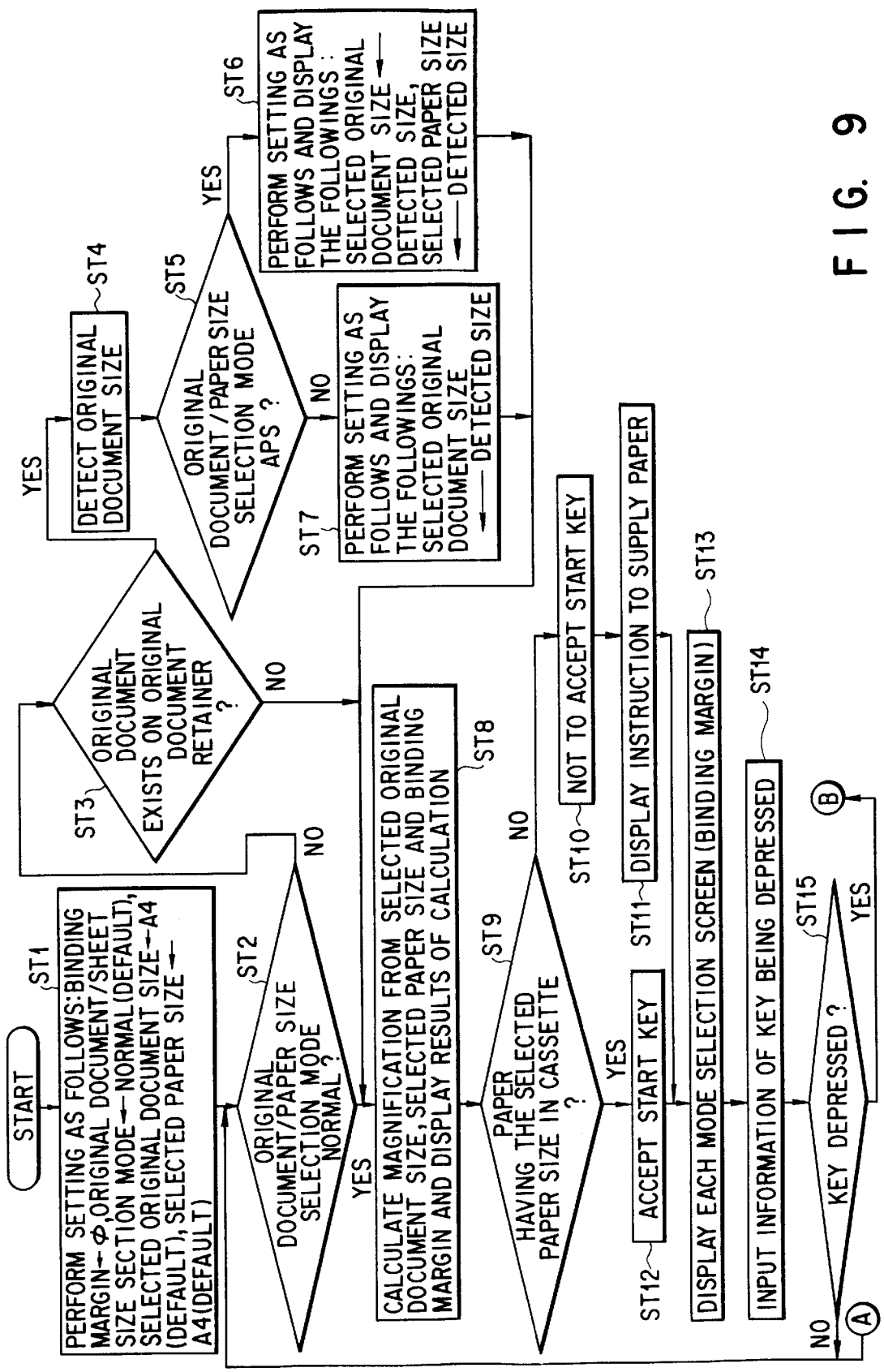
FIG. 9 is a flow chart of the operations for reading, storing and printing an original document.
Figure 10:
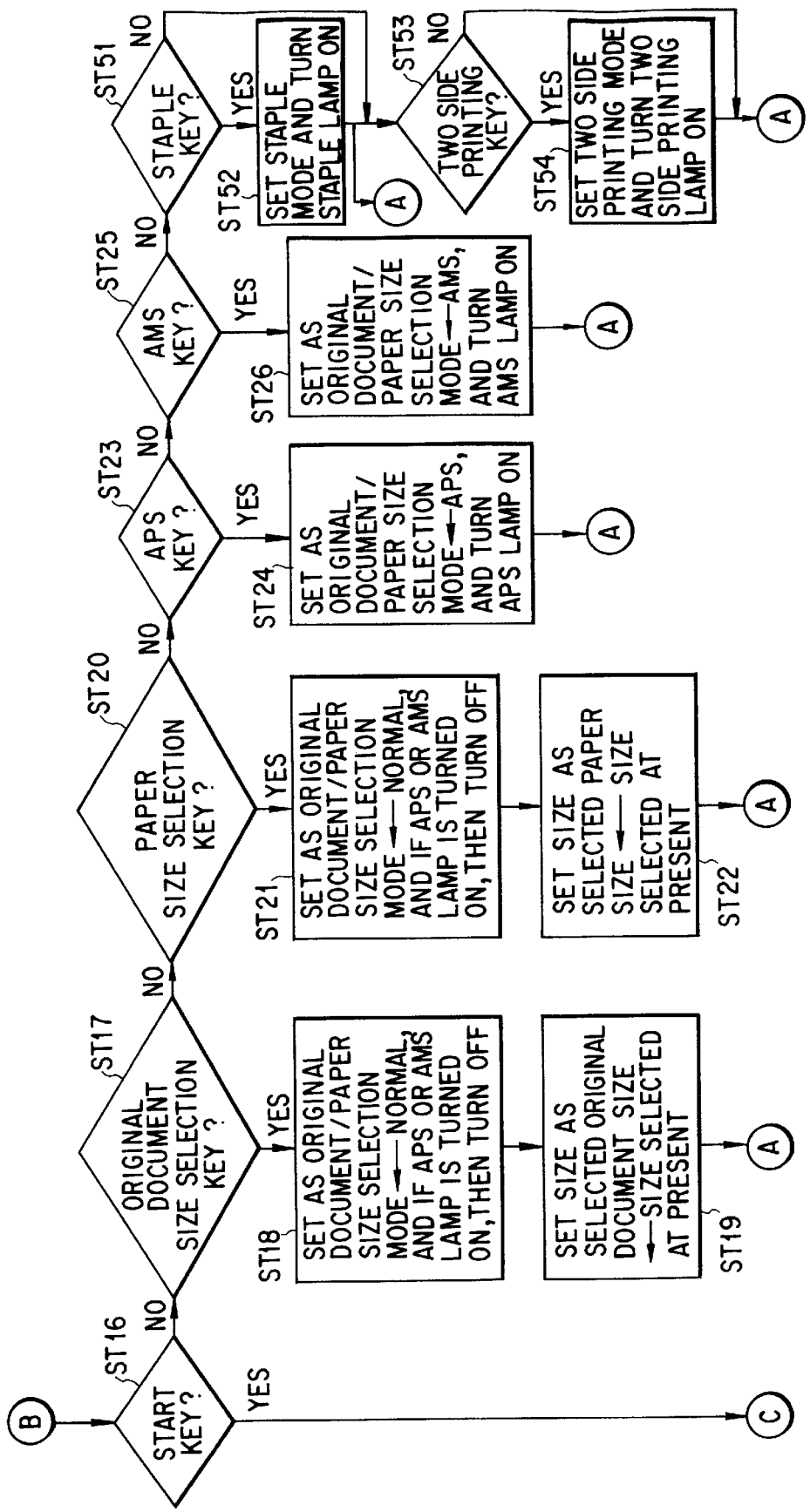
FIG. 10 is a flow chart of the operations for reading, storing and printing an original document.
Figure 11:
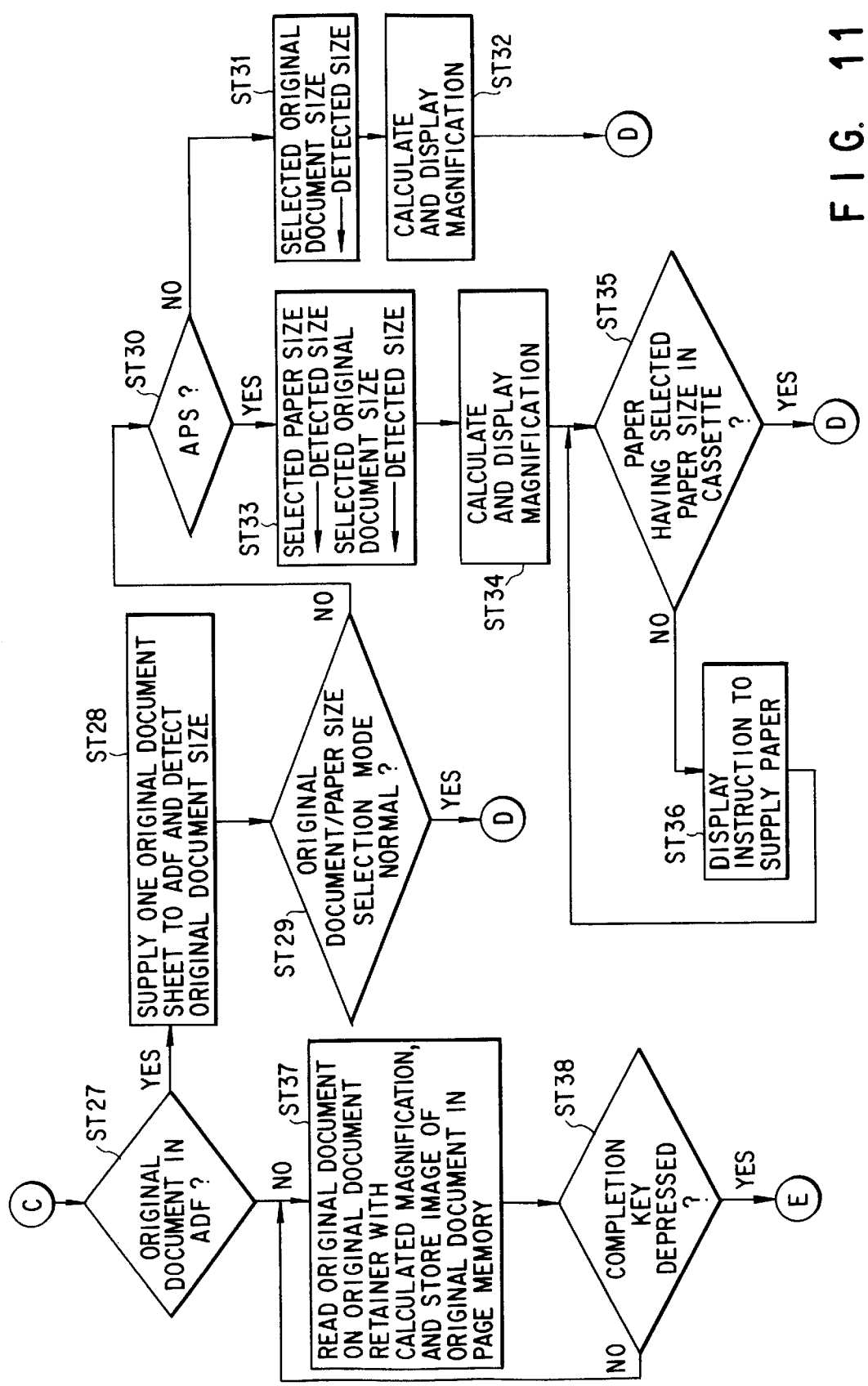
FIG. 11 is a flow chart of the operations for reading, storing and printing an original document.
Figure 12B:
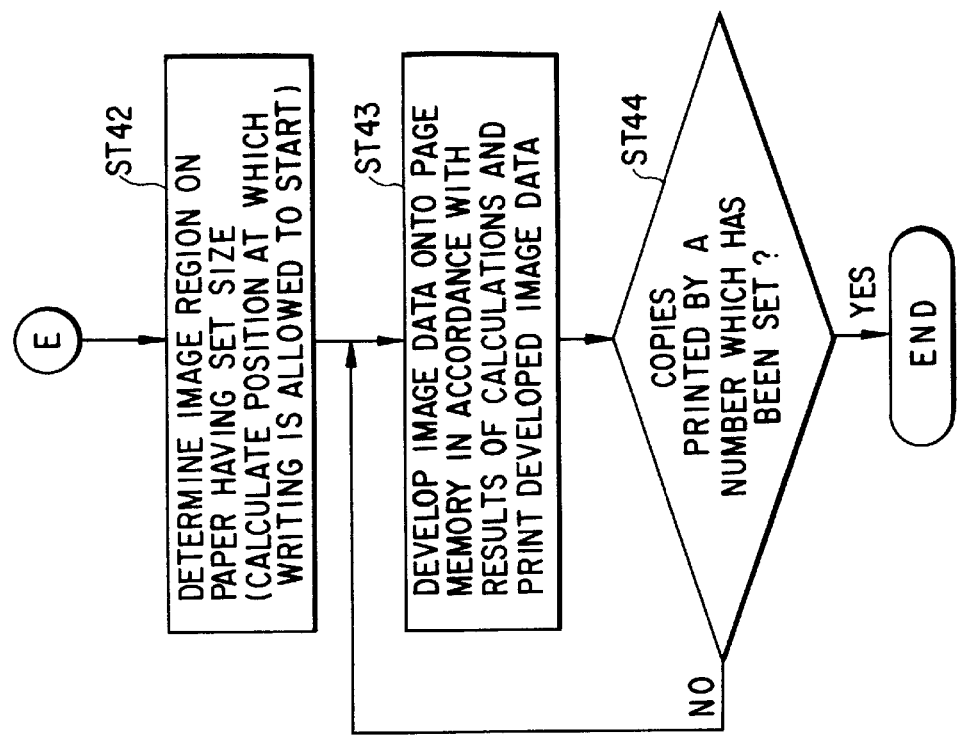
FIGS. 12A and 12B show a flow chart of the operations for reading, storing and printing an original document.
Figure 12A:
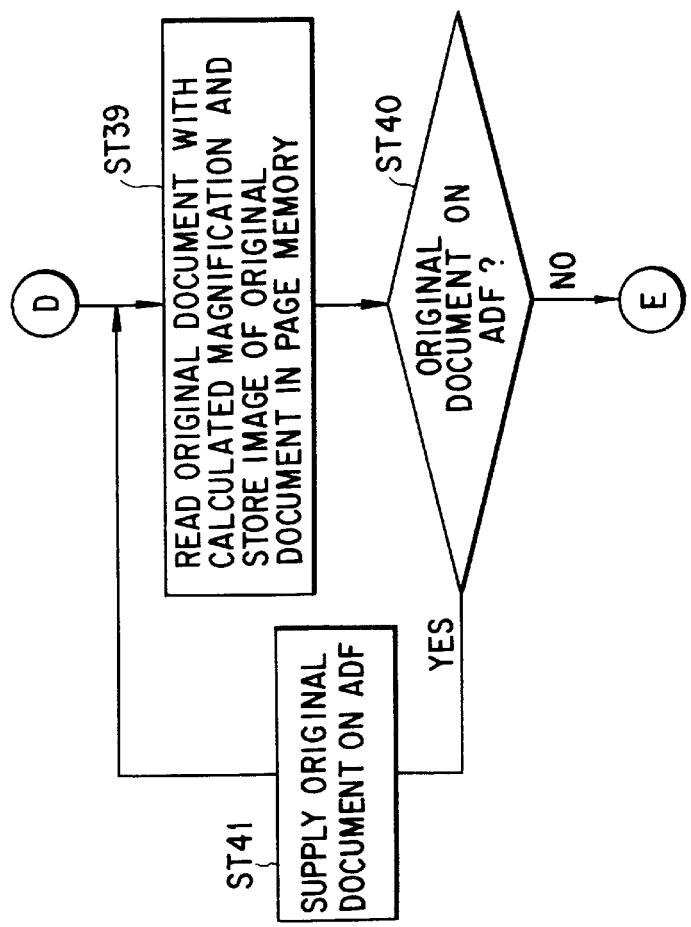

FIG. 8 shows timings of input of an original document and printing out of the images of the original document sheets when the printing operation is performed in a staple sorting mode. In this embodiment, images of four original document sheets set to an automatic original-document supply unit 200 are input and three copies are printed in a staple sorting mode. The printed sheets are stapled into each copy so that three copies are stacked on the sheet-discharge tray 74. The foregoing operation will now be described in detail.

Initially, the main CPU 100 causes a scanner 313 to read the original document and transfers the read image to a page memory portion 302 through an image processing portion 314. The transferred image is compressed for each page and stacked in file area M2 of a page memory 323. That is, the scanner 313 initially scans (reads) a fourth page of the supplied original document. The read image data item is temporarily stored in page buffer region M1 of the page memory 323, and then compressed by a compressing/expanding portion 324 so as to be formed into a file which is then stored in the file area M2 of the page memory 323. The main CPU 100 repeats the foregoing operation for third, second and first pages until all of the original document sheets are processed.

Then, the main CPU 100 causes the compressing/expanding portion 324 to expand compressed data of the fourth page formed into the file and stored in the file area M2 of the page memory 323. The expanded data item is transferred to a printer 315 through the image processing portion 314 so as to be printed. The main CPU 100 repeats the foregoing operation for the third, second and the first pages. After the first (the leading) page has been printed, the main CPU 100 transmits a stapling execution signal to a stapler 76 so that the first copy (consisting of four pages) is stapled by the stapler 76, followed by being stacked on a sheet-discharge tray 74. Since staple sorting of three copies has been instructed, the foregoing operation is repeated for the second copy and the third copy so that three copies are stacked on the sheet-discharge tray 74.

The present invention is structured such that sequential printing operations are not interrupted even if the file area M2 of the page memory 323 is fully filled (encounters memory full) during an operation of reading or storing an original document in a state where the staple sorting mode has been set.

The operations for reading the original document, storing images of the original document and printing the same to be performed in the foregoing structure will now be described with reference to a flow chart shown in FIGS. 9 to 12.

When a menu has been selected by an operator who has operated an operation panel 114, the main CPU 100 causes an LCD display unit 116 to display a mode selection screen. With the mode selection screen, the binding margin, original document/sheet size selection mode and the like are set (ST1). Note that the default is determined such that the original document/sheet size selection mode is "normal", the selected original document size is A4 size and the selected sheet size is A4 size.

If the original document/sheet size selection mode is not "normal" (ST2) and in a case where an original document exists on the original-document retainer 2 (ST3), then the size of the original document is detected by an original document detection sensor 169 (ST4). If the original document/sheet size selection mode is APS (Auto Paper Select) (ST5), the original document size is detected and sheets having the same size as that of the original document are selected (ST6). If the binding margin has not been set, a magnification of 100% is selected. If the original document/sheet size selection mode is AMS (Auto Magnification Select) (in a case of "No" in step ST5), the size of the original document is detected and the size set in step ST1 is employed (ST7). In step ST8 the magnification is calculated in accordance with the selected original document size and the selected paper size so as to be displayed on the LCD display unit 116.

The main CPU 100 confirms whether the sheet having the selected size exists in a sheet supply cassette 30 (ST9). If the sheet does not exist, the main CPU 100 performs setting in such a manner that the instruction by using the start key (the copy key) 121 is not accepted (ST10). Then, an instruction to supply sheets is displayed on the LCD display unit 116 (ST11). If sheets having the selected size exist in the sheet supply cassette 30, the main CPU 100 performs setting in such a manner that the instruction using the start key (the copy key) 121 is accepted (ST12).

Then, the main CPU 100 causes the LCD display unit 116 to display the mode selection screen (the binding margin and so forth) (ST13) to receive information about respective depressed keys (ST14). If keys have been depressed (ST15), the main CPU 100 determines information corresponding to the depressed keys as follows:

If the key depressed in step ST16 is the start key (the copy key) 121, the flow is shifted to step ST27. If the key is not the start key (the copy key) 121, the flow is shifted to step ST17. If it is determined that the original-document size selection key, such as "B5" or "A3", displayed on the LCD display unit 116 has been depressed in step ST17, the original document/sheet size selection mode is set to be normal. If an APS lamp or an AMS lamp is turned on, the lamp is turned off (ST18). Then, the size of the original document selected in step ST17 is set as the selected original document size, followed by returning the flow to step ST2 (ST19). If it is determined that the sheet size selection key, such as "B5" or "A3" displayed on the LCD display unit 116 has been depressed in step 20, the original document/sheet size selection mode is set to be normal. If it is determined that the APS lamp or the AMS lamp is turned on, the lamp is turned off (ST21). Then, the sheet size selected in step ST20 is set as the selected sheet size, followed by returning the flow to step ST2 (ST22). If it is determined that the APS key displayed on the LCD display unit 116 has been depressed in step ST23, the original document/sheet size selection mode is set to APS, followed by turning the APS lamp on. Then, the flow returns to step ST2 (ST24). If it is determined that the AMS key displayed on the LCD display unit 116 has been displayed in step ST25, the original document/sheet size selection mode is set to AMS, followed by turning the AMS lamp on. Then, the flow returns to step ST2 (ST26).

If the key depressed in step ST25 is not the AMS key, whether or not the depressed key is the staple mode key is determined (ST51). If the key is the staple key, the staple mode is set (ST52). In step ST53 whether the depressed key is the two-side printing key is determined. If the key is the two-side printing key, the two side printing mode is set (ST54).

In step ST27 the main CPU 100 checks whether an original document exists on the automatic original-document supply unit 200 in accordance with a detection signal supplied from the original-document detection sensor 29. If an original document exists, one of the original document sheets on the automatic original-document supply unit 200 is supplied, followed by checking the size of the original document by the original document detection sensor 169 (ST28). If the original document/sheet size selection mode is normal in step ST29, the flow is shifted to step ST39. If the original document/sheet size selection mode is not normal in step ST29 and if the APS is not selected in step ST30, the selected original document size is set to the size detected in step ST28 (ST31).

Moreover, the magnification is calculated and the obtained magnification is displayed on the LCD display unit 116 (ST32). Then, the flow is shifted to step ST39. If the APS has been selected in step ST30, the selected paper size and the selected original document size are set to be the detected sizes (ST33).

Moreover, the magnification is calculated and the obtained magnification is displayed on the LCD display unit 116 (ST34). If the sheets having the selected sheet size exist in the sheet supply cassette 30 in step ST35, the flow is shifted to step ST39. If the sheet having the selected sheet size does not exist in the sheet supply cassette 30, an instruction to supply sheets is displayed on the LCD display unit 116 (ST36).

In step ST27 the main CPU 100 checks whether an original document exists on the automatic original-document supply unit 200 in accordance with a detection signal supplied from the original-document detection sensor 29. If no original document exists, the original document on the original-document retainer 2 is read with the magnification calculated in step ST8. Then, the read image of the original document is compressed for each page so as to be stored in the page memory 323 of the page memory portion 302 as compressed data (ST37). When a completion key on the LCD display unit 116 is depressed, the flow is shifted to step ST42.

In step ST39 the main CPU 100 reads the original document with the calculated magnification, followed by compressing the read image of the original document for each page so as to be stored in the page memory 323 of the page memory portion 302 as compressed data (ST39). The operation for reading the original document is continued until all of the original document sheets on the automatic original-document supply unit 200 are processed (ST40 and ST41). After all of the original document sheets have been processed, the flow is shifted to step ST42.

In step ST42 the main CPU 100 determines the image region on the set sheet size (calculates the position at which writing starts). In accordance with a result of the calculation, the main CPU 100 develops compressed image data stored in the page memory 323, the development being performed in the page memory portion 302. Then, image data is printed by the printer 315 under control of the image processing portion 314 (ST43). After the original document has been printed by a set number, the operation is completed (ST44). As described above, the image of the original document is read, stored and printed.

The operation of the embodiment of the present invention will now be described such that a case where three copies of an original document consisting of ten sheets are printed in the staple sorting mode and memory full has taken two times during the operation is given as an example.

When the staple sorting mode on the selection screen displayed on the LCD display unit 116 has been depressed and selected by an operator, the main CPU 100 displays, for example, a requirement to set a needed number of copies (three in this case) on the LCD display unit 116. Then, the operator sets the required number of copies and so forth.

The main CPU 100 causes the scanner 313 to scan (read) the original document to temporarily store image data in the page buffer region M1 of the page memory 323 in the page memory portion 302. Then, the main CPU 100 causes the compressing/expanding portion 324 to compress the image data to form the same into a file which is then stored (memorized) in the file area M2 of the page memory 323.

As shown in FIG. 13A, in a case where compressed data items of the tenth page, the ninth page and the eighth page have been stored in the file area M2 of the page memory 323 and file area M2 of the page memory 323 has encountered memory full during storage of the seventh page, compressed data of the seventh page cannot be stored in the file area M2 of the page memory 323. However, the compressed data item of the seventh page is stored in the page buffer region M1 of the page memory 323 as image data which has not been compressed. At this time, the main CPU 100 temporarily interrupts supply of the original document from the automatic original-document supply unit 200 and the scanning operation of the scanner 313. Moreover, the main CPU 100 interrupts the output of the stapling execution signal to the stapler 76.

Then, the main CPU 100, as shown in FIG. 13B, causes the compressing/expanding portion 324 to expand compressed data of the tenth page formed into a file and stored in the file area M2 of the page memory 323 as the first output copy to be sorted, followed by printing the expanded data by the printer 315 under control of the image processing portion 314. Then, the foregoing operation is repeated for the ninth page and the eighth page so that three sheets (the tenth, ninth and the eighth pages) of the first copy are printed out and stacked on the sheet-discharge tray 74. Since three copies have been set in this case, the operation for the second copy and the third copy is repeated so that three copies are stacked on the sheet-discharge tray 74. At this time, the main CPU 100 operates the tray drive portion 229 to shift the sheet-discharge tray 74 so that the positions on the sheet-discharge tray 74 at which the first, second and the third copies are discharged are shifted. Thus, each copy can easily be identified.

Since compressed data in the file area M2 is made empty, the main CPU 100 causes the compressing/expanding portion 324 to compress image data of the seventh page stored in the page buffer region M1 of the page memory 323 so as to be formed into a file which is stored in the file area M2 of the page memory 323. Then, the main CPU 100 causes the automatic original-document supply unit 200 to start supplying the original document and the scanner 313 to start performing scanning. Thus, the original document from the sixth page is stored in the file area M2 of the page memory 323.

FIG. 14A shows re-compression and film forming operations and following re-scanning and storage operations. If the file area M2 of the page memory 323 encounters memory full during the process for the fourth page, image data of the fourth page cannot be stored in the file area M2 of the page memory 323. However, image data of the fourth page has been stored in the page buffer region M1 of the page memory 323 as image data which has not been compressed. At this time, the main CPU 100 temporarily interrupts supply of the original document from the automatic original-document supply unit 200 and the scanning operation of the scanner 313. Moreover, the main CPU 100 interrupts the output of the stapling execution signal to the stapler 76.

Then, the main CPU 100 expands and prints compressed data of the seventh, sixth and the fifth pages stored in the file area M2 of the page memory 323, as shown in FIGS. 14B, 14C and 14D. The main CPU 100 repeats the foregoing operation for the first, second and the third copies so that the three copies are stacked on the sheet-discharge tray 74. Also at this time, the main CPU 100 operates the tray drive portion 229 to shift the sheet-discharge tray 74 so that the positions on the sheet-discharge tray 74 at which the first, second and the third copies are discharged are respectively shifted. Thus, each copy can easily be identified.

Since compressed data in the file area M2 of the page memory 323 is made empty, the main CPU 100 causes the compressing/expanding portion 324 to compress image data of the fourth page stored in the page buffer region M1 of the page memory 323 so as to be formed into a file which is stored in the file area M2 of the page memory 323. Then, the main CPU 100 causes the automatic original-document supply unit 200 to start supplying the original document and the scanner 313 to start performing scanning. Thus, the original document from the third page is stored in the file area M2 of the page memory 323.

FIG. 15A shows re-compression and file forming operations and following scanning and storage operations.

After the residual original document sheets have been scanned, compressed and formed into files so as to be stored in the file area M2 of the page memory 323, the main CPU 100, as shown in FIGS. 15B, 15C and 15D, expands and prints compressed data of the fourth, third, second and the first pages stored in the file area M2 of the page memory 323. The main CPU 100 repeats the foregoing operation for the first, second and the third copies so that the three copies are stacked on the sheet-discharge tray 74. Also at this time, the main CPU 100 operates the tray drive portion 229 to shift the sheet-discharge tray 74 so that the positions on the sheet-discharge tray 74 at which the first, second and the third copies are discharged are respectively shifted. Thus, each copy can easily be identified. Moreover, the main CPU 100 does not output the stapling execution signal.

As a result, three copies each consisting of three sheets (the tenth, ninth and the eighth pages), three copies each consisting of three sheets (the seventh, sixth and the fifth pages) and three copies each consisting of four sheets (the fourth, third, second and the first pages) are stacked on the sheet-discharge tray 74 while being shifted, respectively. Thus, the image forming operation in the staple sorting mode is completed. In the foregoing case, the printed sheets are not stapled but stacked on the sheet-discharge tray 74.

Even if stack full takes place when sheets each having one printed side are temporarily stacked on the tray 75b of the automatic two side unit 75 after the two side printing operation has been performed by using the automatic two side unit 75 in the staple sorting mode, the printing operation is not interrupted. That is, the printing out operation can be performed without performing stapling.

As described above, according to the embodiment of the present invention, there can be provided an image forming apparatus capable of forming images of all of original document pages if the page memory encounters data full during input of image data of the original document when the staple sorting mode, in which sorting is performed and each copy is stapled, has been set.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image forming apparatus comprising:

means for setting image forming conditions including a mode for binding in units of a predetermined number of image forming mediums when images are formed on said image forming mediums from image information;

means for reading image information of an original document;

means for storing image information read by said reading means within a storage capacity;

means for forming images under the image forming conditions set by said setting means and in accordance with image information stored in said storage means; and control means for performing control so as to cancel the mode to perform an image forming operation using image information stored in said storage means when an amount of image information read by said reading means for storage in said storage means is larger than the storage capacity of said storage means when the setting means sets the image forming conditions including said mode.

2. An apparatus according to claim 1, wherein said control means includes:

a first control device, responsive to a full state of the storage means, for forming an image corresponding to image information stored in the storage means, for erasing the image information from the storage means, and for controlling said reading means to restart reading a residual original document corresponding to the image information which exceeds the storage capacity of said storage means and further controlling said storage means to restart storing the residual original document; and a second control device for controlling an image forming operation under the image forming conditions which do not use the mode for binding in units of a predetermined number of image forming mediums set by said setting means.

3. An apparatus according to claim 1, wherein said setting means includes means for setting a mode for forming images on two sides of said image forming mediums, and said apparatus further comprises first conveyance means for conveying the image forming mediums to said image forming means;

second conveyance means for temporarily stacking, onto an image forming medium receiving portion, a plurality of image forming mediums each having an image on one side, then inverting the image forming mediums, and then supplying the image forming mediums to said image forming means, said second conveyance means operating when a two-side image forming mode has been set by said setting means; and third conveyance means for conveying, to a discharge portion, the image forming mediums each having an image on each side, and wherein said control means includes a first control device for canceling the mode for binding in units of a predetermined number of image forming mediums when the mode for binding in units of a predetermined number of image forming mediums and the mode for forming images on two sides of the image forming mediums are defined by the image forming conditions set by said setting means when the number of image forming mediums is larger than a receivable capacity of said image forming medium receiving portion;

a second control device for controlling the image forming means to perform an image forming operation using image information stored in said storage means in such a manner that the mode for binding in units of a predetermined number of image forming mediums is suspended and other image forming conditions set by said setting means are left unchanged.

4. An apparatus according to claim 1, further comprising a sheet discharge tray onto which the image forming mediums having images formed by said image forming means are discharged; and drive means for forwards, rearwards and sideways shifting said sheet discharge tray, wherein said setting means includes means for setting a sorter mode when images are formed from image information stored in said storage means, and said control means includes a means for performing control such that said drive means shifts said sheet discharge tray for each predetermined number of the image forming mediums being sorted, in a case where said sorter mode has been set by said setting means.

5. An image forming apparatus comprising:

means for setting image forming conditions including a staple mode for stapling each copy when images based on image data are formed on paper;

a scanner for reading an original document to supply image data corresponding to the original document;

a memory having first and second regions, said first region being arranged to store image data supplied from said scanner and said second region having a storage capacity;

means for compressing image data stored in said first region to store compressed image data for a plurality of images in said second region of said memory;

means for expanding compressed data stored in said second region of said memory to supply expanded data;

a printer for forming images under the image forming conditions set by said setting means and in accordance with expanded data supplied from said expansion means; and control means for performing control, said control means including a first control device for suspending the staple mode when the staple mode has been set by said setting means and compressed image data for storage in said second region of said memory is larger than the storage capacity of said second region, and a second control device for controlling said expansion means to expand compressed data stored in said second region and for controlling said printer to perform an image forming operation using expanded data in such a manner that the staple mode is suspended and image forming conditions set by said setting means are left unchanged.

6. An apparatus according to claim 5, wherein said control means further includes:

a third control device for controlling said compression means to compress image data stored in said first region of said memory, causing compressed data to be stored in said second region, controlling said scanner to restart reading residual original document sheets, controlling said memory to restart storing the residual original document sheets, and controlling said compression means to restart compressing the residual original document sheets, said third control device operating after compressed data stored in said second region of said memory has been expanded and the image forming operation has been completed; and a fourth control device for controlling image forming operation under image forming conditions except the staple mode set by said setting means.

7. An apparatus according to claim 5, wherein said setting means includes means for setting a mode for forming images on two sides of the paper, said apparatus further comprising first conveyance means for conveying the paper to said printer, second conveyance means for temporarily stacking, onto a paper receiving portion, a plurality of paper sheets each having an image on one side, inverting the paper sheets, and supplying the paper sheets to said printer, and third conveyance means for conveying, to a discharge portion, the paper sheets each having an image on each side, and wherein said control means includes a third control device for suspending the staple mode in a case where said staple mode and said mode for forming images on two sides of the paper have been included in the image forming conditions determined by the setting means and a number of paper sheets to be stacked is larger than the capacity that can be stacked, and a fourth control device for controlling the expansion means to expand compressed data stored in the second region and controlling the printer to perform an image forming operation using expanded data in such a manner that the staple mode is suspended and other image forming conditions set by the setting means are left unchanged.

8. An apparatus according to claim 5, further comprising a sheet discharge tray onto which paper sheets on which images have been formed by said printer are discharged; and drive means for forwards, rearwards and sideways shifting said sheet discharge tray, wherein said setting means includes means for setting a sorter mode when images are formed from image information stored in said memory, and said control means includes a means for performing control such that said drive means shifts said sheet discharge tray for each copy output while being sorted in a case where said sorter mode has been set.

9. An image forming apparatus comprising:

means for setting image forming conditions including a first mode for binding in units of a predetermined number of image forming mediums and a second mode for forming images on two sides of said image forming mediums, when images are formed on said image forming mediums from image information;

means for reading information of an original document;

means for forming images under the image forming conditions set by said setting means and in accordance with image information read by said reading means;

first conveyance means for conveying the image forming mediums to the image forming means;

second conveyance means for temporarily stacking onto an image forming medium receiving portion a plurality of image forming mediums each having an image on one side, inverting the image forming mediums, and supplying the image forming mediums to the image forming means, said second conveyance means operating when said second mode has been set by said setting means;

third conveyance means for conveying to a discharge portion the image forming mediums each having an image on each side;

first control means for suspending the first mode when the first and second modes are defined by the image forming conditions set by said setting means and when a number of image forming mediums is larger than a receivable capacity of said image forming medium receiving portion; and second control means for controlling the image forming means to perform an image forming operation by use of image information stored in storage, with the first mode being suspended and with other conditions set by the setting means being maintained.

10. An image forming apparatus comprising:

means for setting image forming conditions including a mode for binding image forming mediums into sets each having a predetermined number of the image forming mediums when images are formed from image information on the image forming mediums;

means for reading image information of an original document;

means for storing image information read by said reading means;

means for forming images under the image forming conditions set by said setting means and in accordance with image information stored in said storage means; and first control means for controlling said image forming means to suspend the mode for binding image forming mediums into sets each having a predetermined number of the image forming mediums when said image forming means fails to continuously form images on said predetermined number of the image forming mediums even though the mode for binding image forming mediums into sets each having said predetermined number of the image forming mediums has been set by said setting means; and second control means for performing an image forming operation for images that can be formed.

11. An image forming method comprising the steps of:

setting image forming conditions including a mode for binding each copy when images are formed on image forming mediums from image information; and reading image information of an original document;

storing read image information in a memory which has a storage capacity;

forming images on paper sheets by using image information stored in said memory in such a manner that the mode for binding each copy is suspended and the image forming conditions set by said setting remain as the other conditions in a case where the mode for binding each copy has been set and image information to be stored is larger than the capacity that can be stored in said memory.

* * * * *